(12) United States Patent
Brown et al.

(10) Patent No.: US 11,940,580 B2
(45) Date of Patent: Mar. 26, 2024

(54) HETEROGENEOUS SUBSURFACE IMAGING SYSTEMS AND METHODS

(71) Applicants: Massachusetts Institute of Technology, Cambridge, MA (US); The Trustees of Boston University, Boston, MA (US)

(72) Inventors: Stephen Brown, Montpelier, VT (US); Thomas Szabo, Newburyport, MA (US); Daniel R. Burns, North Falmouth, MA (US); Michael Fehler, Boston, MA (US)

(73) Assignees: Massachusetts Institute of Technology, Cambridge, MA (US); The Trustees of Boston University, Boston, MA (US)

( * ) Notice: Subject to any disclaimer, the term of this patent is extended or adjusted under 35 U.S.C. 154(b) by 905 days.

(21) Appl. No.: 16/598,442

(22) Filed: Oct. 10, 2019

(65) Prior Publication Data
US 2020/0116881 A1    Apr. 16, 2020

Related U.S. Application Data

(60) Provisional application No. 62/744,826, filed on Oct. 12, 2018.

(51) Int. Cl.
*G01V 1/28* (2006.01)
*G01V 3/08* (2006.01)
(Continued)

(52) U.S. Cl.
CPC .............. *G01V 1/284* (2013.01); *G01V 3/083* (2013.01); *G01V 3/12* (2013.01); *G01V 3/36* (2013.01);
(Continued)

(58) Field of Classification Search
CPC .......... G01V 1/284; G01V 3/083; G01V 3/12; G01V 3/36; G01V 2003/084; G01V 2003/085; G01V 2003/086
See application file for complete search history.

(56) References Cited

U.S. PATENT DOCUMENTS 3,295,100 A    12/1966    Armistead
4,843,597 A    6/1989    Gjessing et al.
(Continued)

FOREIGN PATENT DOCUMENTS

CN    102830401 A  * 12/2012
CN    109742529 A  *  5/2019
(Continued)

OTHER PUBLICATIONS

International Preliminary Report on Patentability in PCT/US2019/055593 dated Apr. 22, 2021.
(Continued)

*Primary Examiner* — Patrick Assouad
*Assistant Examiner* — Sean Curtis
(74) *Attorney, Agent, or Firm* — Schmeiser, Olsen & Watts LLP; Timothy P. Collins

(57) ABSTRACT

A system for near-surface geophysical subsurface imaging for detecting and characterizing subsurface heterogeneities comprises an instrument that outputs probing electromagnetic signals through a ground surface that interact and are affected by scattered signals of acoustic waves that travel through the ground surface and further senses vibrational modes of a subsurface below the ground surface; an imaging device that dynamically generates a time sequence of images of properties of the acoustic waves and maps elastic wave fields of the acoustic waves; and a processor that analyzes (Continued)

dynamic multi-wave data of the images to quantify spatial variations in the mechanical and viscoelastic properties of the subsurface.

7 Claims, 8 Drawing Sheets

(51) Int. Cl.
$G01V\ 3/12$ (2006.01)
$G01V\ 3/36$ (2006.01)

(52) U.S. Cl.
CPC .. $G01V\ 2003/084$ (2013.01); $G01V\ 2003/085$ (2013.01); $G01V\ 2003/086$ (2013.01)

(56) References Cited

U.S. PATENT DOCUMENTS

| | | | | |
|---|---|---|---|---|
| H1524 | H * | 4/1996 | Thompson | 324/334 |
| 5,588,032 | A * | 12/1996 | Johnson | G01S 15/895 378/90 |
| 5,835,054 | A * | 11/1998 | Warhus | G01S 13/867 342/197 |
| 5,920,285 | A * | 7/1999 | Benjamin | H01Q 21/08 342/368 |
| 5,974,881 | A * | 11/1999 | Donskoy | G01N 29/40 367/87 |
| 6,005,916 | A * | 12/1999 | Johnson | G06T 11/006 600/425 |
| 6,134,966 | A * | 10/2000 | Donskoy | G01N 29/40 73/579 |
| 6,415,666 | B1 * | 7/2002 | Donskoy | G01N 29/46 367/87 |
| 6,429,802 | B1 * | 8/2002 | Roberts | G01V 3/12 342/195 |
| 6,536,553 | B1 * | 3/2003 | Scanlon | G01V 1/047 73/639 |
| 6,667,709 | B1 | 12/2003 | Hansen et al. | |
| 6,751,553 | B2 | 6/2004 | Young et al. | |
| 6,809,991 | B1 | 10/2004 | Pepper et al. | |
| 7,796,466 | B2 * | 9/2010 | Combee | G01V 1/38 367/134 |
| 7,841,982 | B2 * | 11/2010 | Johnson | A61B 8/463 600/443 |
| 7,930,103 | B2 * | 4/2011 | Young | G01V 1/00 342/22 |
| 8,086,426 | B2 * | 12/2011 | El Ouair | G01V 1/30 702/14 |
| 8,089,390 | B2 | 1/2012 | Jones et al. | |
| 8,120,991 | B2 * | 2/2012 | Koren | G01V 1/32 345/428 |
| 8,228,066 | B2 * | 7/2012 | Ellingsrud | G01V 3/15 324/365 |
| 8,366,619 | B2 | 2/2013 | Kim et al. | |
| 8,478,533 | B2 * | 7/2013 | Thompson | E21B 43/00 702/14 |
| 8,726,734 | B1 | 5/2014 | Lin | |
| 8,797,828 | B1 * | 8/2014 | Lev | G01V 8/00 356/497 |
| 8,849,523 | B1 * | 9/2014 | Chan | A01G 25/167 701/50 |
| 8,873,334 | B2 * | 10/2014 | Thompson | G01V 1/36 702/11 |
| 8,941,816 | B2 * | 1/2015 | Grasmueck | G01V 1/003 367/77 |
| 9,075,154 | B2 * | 7/2015 | Guigne | G01V 3/12 |
| 9,086,501 | B2 * | 7/2015 | Beer | G01S 7/024 |
| 9,291,733 | B2 * | 3/2016 | De Meersman | G01V 1/28 |
| 9,304,224 | B2 * | 4/2016 | Guigne | G01V 3/12 |
| 9,377,528 | B2 | 6/2016 | Birken et al. | |
| 9,453,926 | B2 * | 9/2016 | Vu | G01V 1/44 |
| 9,500,077 | B2 | 11/2016 | Li et al. | |
| 9,646,415 | B2 | 5/2017 | Hanson et al. | |
| 9,651,707 | B2 | 5/2017 | Tayart De Borms et al. | |
| 9,759,838 | B2 * | 9/2017 | Thompson | G01V 1/42 |
| 10,007,996 | B2 * | 6/2018 | Paglieroni | G06V 20/64 |
| 10,203,427 | B2 * | 2/2019 | Thompson | G01V 1/38 |
| 10,378,316 | B2 * | 8/2019 | Thompson | G01V 3/16 |
| 10,768,325 | B2 | 9/2020 | Allegar et al. | |
| 10,976,461 | B2 * | 4/2021 | Arumugam | G01N 24/081 |
| 2004/0225444 | A1 | 11/2004 | Young et al. | |
| 2005/0062639 | A1 * | 3/2005 | Biggs | G01S 13/89 342/194 |
| 2005/0128123 | A1 | 6/2005 | Greneker et al. | |
| 2006/0084859 | A1 * | 4/2006 | Johnson | A61B 5/7257 600/407 |
| 2006/0215175 | A1 * | 9/2006 | Yacoubian | G01N 21/9505 356/502 |
| 2007/0258325 | A1 * | 11/2007 | Grasmueck | G01V 1/003 367/59 |
| 2009/0292516 | A1 | 11/2009 | Searles et al. | |
| 2012/0035862 | A1 * | 2/2012 | Kollgaard | G01N 29/043 702/39 |
| 2012/0195164 | A1 * | 8/2012 | Meersman | G01V 1/28 367/43 |
| 2012/0253680 | A1 * | 10/2012 | Thompson | G16Z 99/00 73/152.16 |
| 2013/0083621 | A1 | 4/2013 | Rikoski | |
| 2013/0338478 | A1 * | 12/2013 | Hirota | A61B 5/0095 600/407 |
| 2014/0104979 | A1 * | 4/2014 | Stolarczyk | G01S 15/876 367/7 |
| 2014/0254317 | A1 * | 9/2014 | Thompson | G01V 1/48 367/40 |
| 2014/0321240 | A1 * | 10/2014 | Barnes | E21B 47/005 367/35 |
| 2015/0071033 | A1 * | 3/2015 | Thompson | G01V 1/36 367/43 |
| 2015/0293213 | A1 * | 10/2015 | Felber | G01S 7/521 367/137 |
| 2016/0077055 | A1 * | 3/2016 | Corum | H01P 3/00 73/627 |
| 2016/0109591 | A1 * | 4/2016 | Kamil Amin | G01V 1/366 367/21 |
| 2016/0274235 | A1 * | 9/2016 | Martin | G01S 7/539 |
| 2016/0320506 | A1 * | 11/2016 | Almuhaidib | G01V 1/282 |
| 2016/0320509 | A1 * | 11/2016 | Almuhaidib | G01V 1/306 |
| 2017/0010388 | A1 * | 1/2017 | Haddad | G01S 13/9027 |
| 2018/0011219 | A1 * | 1/2018 | Thompson | G01V 1/42 |
| 2018/0031731 | A1 * | 2/2018 | Boulanger | G01S 13/885 |
| 2019/0101659 | A1 * | 4/2019 | Ravasi | G01V 1/003 |
| 2019/0113647 | A1 * | 4/2019 | Arumugam | G01V 3/12 |
| 2019/0250305 | A1 * | 8/2019 | Thompson | G01V 11/007 |
| 2020/0116555 | A1 * | 4/2020 | Brown | G01S 13/89 |
| 2020/0116881 | A1 * | 4/2020 | Brown | G01V 1/306 |
| 2021/0215842 | A1 * | 7/2021 | Liu | G01V 1/345 |
| 2021/0278558 | A1 * | 9/2021 | Zhang | G01V 1/345 |

FOREIGN PATENT DOCUMENTS

| | | | | |
|---|---|---|---|---|
| CN | 107656272 | B * | 8/2019 | G01S 13/885 |
| CN | 111812726 | A * | 10/2020 | |
| RU | 2681271 | C1 | 3/2019 | |
| WO | 2002033443 | A2 | 4/2002 | |
| WO | WO-2005085902 | A1 * | 9/2005 | G01S 15/02 |
| WO | 2006099059 | A2 | 9/2006 | |
| WO | WO-2013057484 | A2 * | 4/2013 | G01V 1/02 |
| WO | 2016079593 | A1 | 5/2016 | |
| WO | WO-2016079593 | A1 * | 5/2016 | G01S 13/86 |
| WO | WO-2017160162 | A1 * | 9/2017 | G01V 1/003 |
| WO | WO-2019079323 | A1 * | 4/2019 | G01N 21/47 |
| WO | WO-2020077067 | A1 * | 4/2020 | G01V 1/284 |
| WO | WO-2020077070 | A1 * | 4/2020 | G01H 9/002 |
| WO | WO-2021245922 | A1 * | 12/2021 | G01C 9/02 |

OTHER PUBLICATIONS

International Preliminary Report on Patentability in PCT/US2019/055599 dated Apr. 22, 2021.

(56) References Cited

OTHER PUBLICATIONS

Non-Final Office Action in U.S. Appl. No. 16/598,468 dated Jan. 24, 2022.
International Search Report and Written Opinion in PCT/US2019/055593 dated Jan. 2, 2020; 10 pages.
International Search Report and Written Opinion in PCT/US2019/055599 dated Jan. 31, 2020; 13 pages.
Szabo, T.L. "Obtaining subsurface profiles from surface-acoustic-wave velocity dispersion," Journal of Applied Physics, No. 46, 1975.
Fink, Mathias and Michael Tanter, "Multiwave imaging and super resolution," Feb. 2010, Physics Today, pp. 28-33.
Roth, Michael and Klaus Holliger, "The non-geometric PS wave in high-resolution seismic data: observations and modeling," 2000, Geophysical Journal International, vol. 140, pp. F5-F11.
Jeong, et al. "Principles and clinical application of ultrasound elastography for diffuse liver disease," Jul. 2014, Ultrasonography No. 33(3), pp. 149-160.
Leiv-J. Gelius, "INF-GEO 3310: Introduction to seismic processing and imaging," 2007, The University of Oslo, pp. 1-33.
Auld, B.A. "Acoustic Fields and Waves in Solids," 1990, Kreiger Publishing, Malabar, FL, second edition, vol. II, p. 88-93.
Final Office Action in U.S. Appl. No. 16/598,468 dated Aug. 19, 2022; 49 pages.
Baker, et al., "Near-Surface Imaging Using Coincident Seismic and GPR Data", Feb. 2001, Geophysical Research Letters, vol. 28, No. 4, pp. 627-630, https://agupubs.onlinelibrary.wiley.com/doi/abs/10.1029/2000GL008538.
Liu, "Using GPR and Seismic Reflection Measurements to Characterize Buried Objects: Large-Scale Simulations", Aug. 1997, IGARSS '97, 1997 IEEE International Geoscience and Remote Sensing Symposium Proceedings. Remote Sensing—A Scientific Vision for Sustainable Development, vol. 3, pp. 1147-1149, DOI: 10.1109/IGARSS.1997.606379, https://ieeexplore.ieee.org/document/606379.
Nieto, et al., "Ultra High-Resolution Seismic and GPR Imaging of Permafrost. Devon Island, Nunavut", 2002, CREWES Research Report, vol. 14, pp. 1-22, 2002, https://www.semanticscholar.org/paper/Ultra-high-resolution-seismic-and-GPR-imaging-of-.-Nieto-Stewart/87b7b5b03a039fdd9c190b942b3809fbf6094086.
Powers, et al., "Integrated Use of Continuous Seismic-Reflection Profiling and Ground-Penetrating Radar Methods at John's Pond, Cape Cod, Massachusetts", 1999, Symposium on the Application of Geophysics to Engineering and Environmental Problems, Oakland, California, pp. 359-368, https://water.usgs.gov/ogw/bgas/publications/SAGEEP99_041/index.html.
Notice of Allowance in U.S. Appl. No. 16/598,468 dated Jul. 26, 2023.

\* cited by examiner ized by the acoustic source.
HETEROGENEOUS SUBSURFACE IMAGING SYSTEMS AND METHODS

CROSS REFERENCE TO RELATED APPLICATION

This invention claims priority to U.S. provisional patent application Ser. No. 62/744,826, filed Oct. 12, 2018, and entitled "Heterogeneous Subsurface Imaging Systems and Methods", which is incorporated entirely herein by reference.

FIELD OF THE INVENTION

The present invention relates generally to near-surface imaging, and more specifically, to a system and method that combines multiple modalities to perform a subsurface imaging operation.

BACKGROUND OF THE INVENTION

Land surveyors, geologists, building contractors, and scientists alike have an interest in assessing the subsurface of a region of land of interest for varying reasons. Modern subsurface imaging techniques are performed to locate and map underground locations, and to reveal various subsurface failure zones at these locations such as natural karst, human-induced sinkholes, soil instability, or various other seismic and electromagnetic nonconformities. However, conventional seismic prospecting methods cannot adequately detect and interpret small, subtle heterogeneities such as tunnels or cavities, unknown or unmapped underground infrastructures, pipelines, and damage zones or failure zones in the soil or sediment substrate that can impact a surface infrastructure such as a building, or damage or failure zones occurring behind a casing inserted into a deep borehole in a drilling operation.

SUMMARY

Some embodiments of the present technology include a system for near-surface geophysical subsurface imaging for detecting and characterizing subsurface heterogeneities, comprising an instrument that outputs probing electromagnetic signals through a ground surface that interact and are affected by scattered signals of acoustic waves that travel through the ground surface and further senses vibrational modes of a subsurface below the ground surface; an imaging device that dynamically generates a time sequence of images of properties of the acoustic waves and maps elastic wave fields of the acoustic waves; and a processor that analyzes dynamic multi-wave data of the images to quantify spatial variations in the mechanical and viscoelastic properties of the subsurface.

Other embodiments include a method for determining a subsurface feature, comprising: transmitting a surface penetrating radar (SPR) signal at a ground surface; receiving a response signal that includes an elastic wave interaction with the SPR signal; rapidly processing the response signal; and determining a physical characteristic of the subsurface feature from the response signal.

Other embodiments include a system for determining subsurface characteristics, comprising: a radar-generating source that transmits a surface penetrating radar (SPR) signal that remotely senses a subsurface vibration; and an imaging apparatus that produces time sequences from a received SPR signal perturbed by acoustic signals.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon showing the principles of the invention.

DETAILED DESCRIPTION

Figure 1:
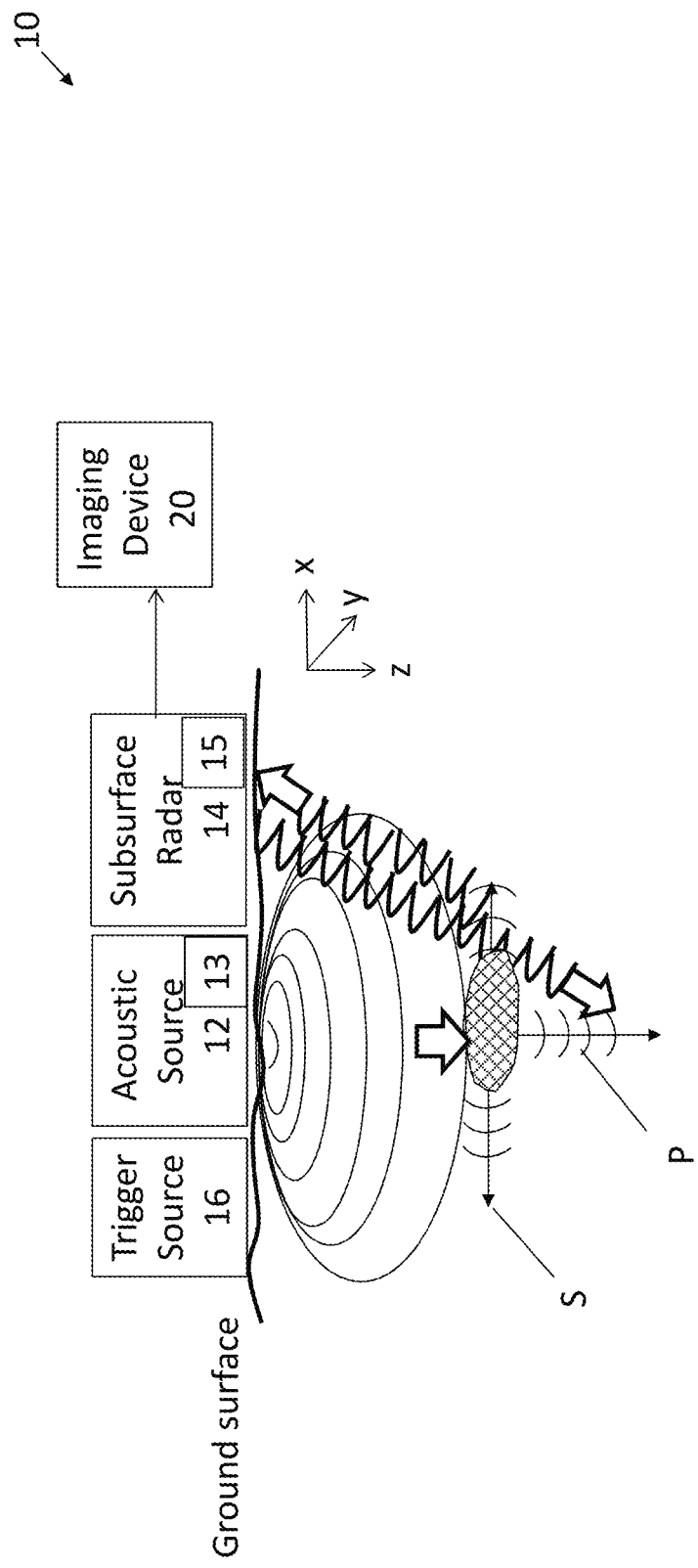
FIG. 1 is a cross-sectional view of a heterogeneous subsurface imaging system performing an operation, in accordance with embodiments of the present disclosure.

Reference is made in various embodiments described below to ground, a surface of the ground, and a subsurface below the surface of the ground. It will be understood that the ground includes soil, road surface or pavement such as asphalt and concrete layers, gravel, sand and the like, and that the surface of the ground is the interface of the ground with the air, fluid, snow, rain, sludge, mud, or free space. The term subsurface as used below includes a depth below the surface. The ground surface and/or subsurface may comprise a surface characteristic such as, but not limited to snow, ice, water, mud, slush, sand, gravel, dirt, rock, debris and salt, steel borehole casing and cement, and so on.

Reference is also made herein to surface penetrating radar (SPR). As used herein, SPR refers to any apparatus, system, and/or method that acquires data from the subsurface region through the surface of the ground and may also acquire data for the surface of the ground. The subsurface region may include boreholes or the like. In preferred embodiments, a SPR is constructed and arranged to detect selected displacement signals and display them versus time. Accordingly, the SPR preferably includes a special-purpose triggering device, for example, described herein.

In brief overview, embodiments of the present disclosure include systems and methods for imaging subsurface heterogeneities or related subsurface features, in which two different imaging modalities are combined synergistically, one of which includes an imaging modality. A targeted ground surface is perturbed with an acoustic source that produces a controlled seismic energy to insonify various subsurface features and that is synchronized with a subsurface penetrating radar apparatus operating as a virtual vibrometer so that a strobe-like sequence of underground vibrations can be produced and observed (or recorded) rapidly and sequentially over time for mapping elastic wave fields, e.g., compressional and/or shear waves. In particular, the SPR apparatus is constructed and arranged to apply a plurality of high frequency probing radar signals, which allows subsurface dielectric contrasts, reflectors, and scatterers vibrating along with the rocks and soils to act as passive markers responding to imposed acoustic vibrations. The detection of subsurface vibrations involves the ability to capture the shape, motion, and/or related characteristics of the scattered signals of the acoustic waves for imaging with high sensitivity. The mapping of compressional and/or shear wave fields in this manner can therefore permit the detection of underlying spatial and/or temporal variations in mechanical properties, for example, a mechanical modulus from shear wave speed, of a subsurface to be illuminated or otherwise detected and analyzed with sufficiently high detail to detect and characterize near-surface heterogeneities that are otherwise too subtle and difficult to image by either modality alone.

One such application may include, but is not limited to, the generation of imaging spatial variations performed to permit early warning to be achieved, for example, the detection of unsynchronized naturally occurring vibrations such as earthquakes. Another application may include the positioning of an acoustic source and radar unit of the system in or near a borehole, whereby changing conditions in the vicinity of boreholes or the like in the subsurface may be monitored to detect zones of possible failure or changing fluid conditions, such as a leakage of fluids near the boreholes. Embodiments of the systems and methods are not limited to the foregoing example applications.

The multi-wave imaging systems and methods in accordance with the embodiments distinguish from conventional geophysical imaging techniques that introduce joint inversion involving the independent processing of disparate geophysical imaging modalities, which are unlinked in both time and action in order to combine separately-acquired static images.

FIG. 1 is a cross-sectional view of a system 10 for imaging subsurface heterogeneities, in accordance with embodiments of the present disclosure. The system 10 may be referred to as a heterogeneous subsurface imaging system.

The system 10 includes an acoustic source 12, for example, an array of controlled acoustic sources or other mechanical vibrating source such as a seismic wave generator or related seismic source, that can produce seismic energy or related acoustic-related forces that includes acoustic or elastic signals, and provide for an imaging modality in which a ground surface is penetrated by the produced signals, resulting in a produced distortion, e.g., seismic waves. In some embodiments, the acoustic source 12 includes a system of vibrating sources deployed at or near the surface of the Earth or in a borehole or the like, which vibrate harmonically and continuously with phase shifts with respect to each other to focus an output for directing and inducing an acoustic wave at a predetermined depth. More specifically, the acoustic source 12 is constructed and arranged to insonify subsurface features, by focusing seismic energy while also varying frequency and signal levels.

In some embodiments, the acoustic source 12 may include an acoustic wave generator that generates a plurality of primary or compressional (P) waves, shear (S) waves, and/or related seismic or elastic acoustic waves at a focus region at the subsurface. The acoustic waves may be induced at various depths, frequencies, wavelengths, amplitudes, and velocities by executing a signal modulation technique, for example, related to an elastography imaging technique. Features of the acoustic source 12 are not limited by this example, and any vibration modulated to create a wave at an acoustic frequency or other frequency that is low as compared to a radar or other probing frequency wave or related disturbance may equally apply, as would naturally occurring vibrational sources such as an earthquake.

In some embodiments, the system 10 also outputs ground-penetrating radar waves or related low amplitude, high frequency signals to execute an imaging operation with respect to a dynamic wave field in response to the insonification produced by the seismic energy generated by the acoustic source. Rapid imaging is achieved because the radar signals operate at a higher frequency and a substantially higher velocity (typically one or several orders of magnitude greater) than the acoustic source. This is achieved by a subsurface radar apparatus 14 such as a SPR apparatus or other surface penetrating radar (SPR) apparatus or probing sensor that provides high frequency probing signals, for example, electromagnetic waves in the microwave band of the radio spectrum into the earth subsurface of interest and receiving the reflected pulses as they encounter spatial and/or temporal variations. The subsurface radar apparatus 14 may provide one or more modalities for sensing the resulting subsurface vibrational modes, including but not limited to time-domain pulse-echo and/or various forms of frequency-modulated continuous wave (FMCW) protocols. Thus, in some embodiments of the systems and methods for imaging subsurface heterogeneities, two different imaging modalities are combined synergistically. In some embodiments, one of the imaging modalities relates to elastography.

Figure 3:
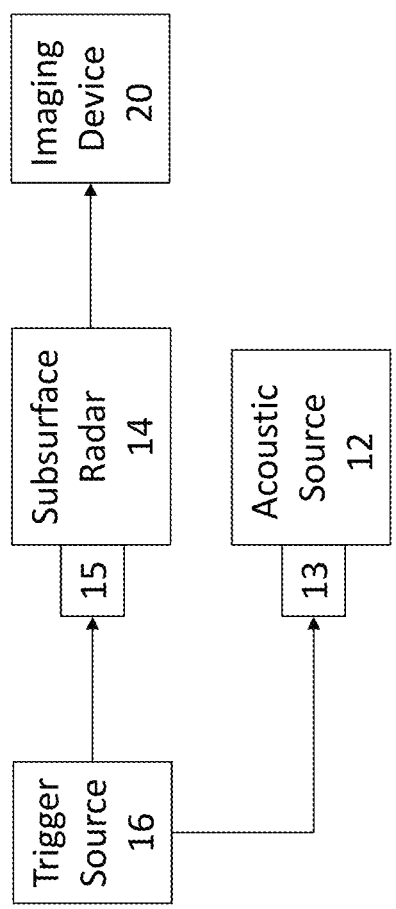
FIG. 3 is a flow diagram illustrating a synchronization of a radar with an acoustic source using a controlled trigger source.
Figure 4:
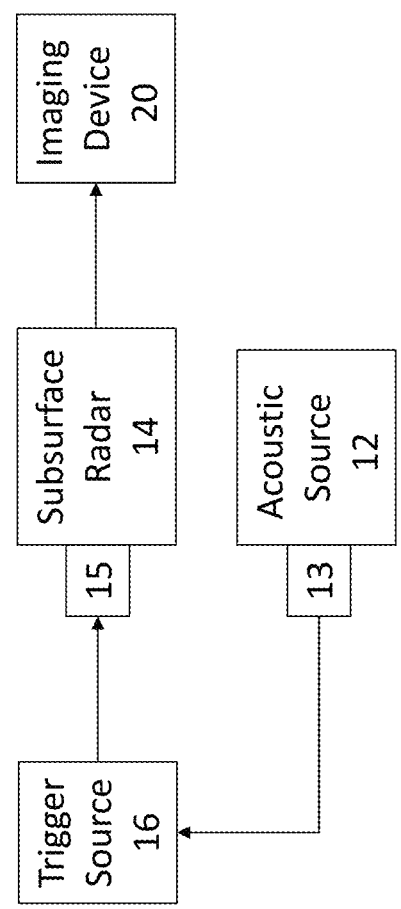
FIG. 4 is a flow diagram illustrating a synchronization of a radar by a detection of a propagating acoustic wave.

To achieve the foregoing, the acoustic source 12 is most often synchronized with the subsurface radar apparatus 14, which in some embodiments can occur by activating a trigger device 16, also referred to as a trigger source. Trigger device 16 can output a series of digital logic pulses which are in some embodiments received by a sensing unit 13 in acoustic source 12 initiating a series of acoustic waves to be transmitted into the subsurface. Trigger device 16 can be a digital clock or a pulse derived from a received external signal, for example, shown in FIG. 3. As also shown in FIG. 3, sensing unit 15 of the radar 14 and sensing unit 13 of acoustic source 12 each receives an output of the trigger device 16, which triggers an internal clock. Sensing units 13 and 15 can function as delay blocks and include time delays such as needed for the acoustic waves to propagate to certain subsurface regions of interest. In a different embodiment, shown in FIG. 4, the acoustic source,12, is itself a vibration such as an earthquake, or asynchronous source and the like, that is sensed by receiving processor 13 which automatically detects the propagating acoustic wave from the vibration source and initiates a pulse to excite the triggering source 16. In other words, sensing unit 13 functions as a seismic receiver, while sensing unit 15 functions as a delay block.

The trigger device 16 output pulses are also received by a sensing unit 15 in the radar unit 14 initiating a series of electromagnetic waves to be transmitted into the subsurface. Sensing unit 15 can also include time delays such as needed for the acoustic waves to propagate to certain subsurface regions of interest. Radar unit 14 then receives the returning radar signals from the subsurface regions of interest. Sensing unit 15 can be used by the radar apparatus 14 to allow for the discrete sampling of the acoustic pulses. More specifically, the trigger device 16 is constructed and arranged to synchronize the sweeps to the proper point of the acoustic or seismic signal, and to achieve clear signal characterization. For example, triggering a radar output such that it monitors the peaks, troughs, zero crossings, or another particular phase characteristic of the acoustic vibration. To achieve this, in some embodiments, the trigger device 16 outputs a plurality of trigger signals that activate the subsurface penetrating radar's antenna(s) to transmit probing radar signals and/or sample a received waveform in response to an interaction with the compressional and shear waves produced by the acoustic source 12. For example, a start of an acoustic transmit sequence can be used. Also, this feature may allow for a stacking across particular phases to be achieved as described below.

For rapid sampling of the dielectric disturbances caused by an acoustic pulse, in some embodiments, either trigger device 16 can send a series of trigger pulses spaced at subintervals of an acoustic cycle or a triggering pulse can initiate a series of pulses internally generated in the radar apparatus 14 for rapid sampling of the acoustic signal cycles at sub-intervals of an acoustic cycle. In an asynchronous configuration, an acoustic wave such as an earthquake can be detected automatically by an external sensor by sensing features of the earthquake signal to initiate trigger device 16 to accomplish acoustic and radar signal synchronization. In addition, a stacking operation may be permitted, for example, described herein.

The subsurface radar apparatus 14 may be constructed and arranged to perform one or more sweeps to obtain the data for interacting with the generated acoustic waves so that an imaging device 20 can perform an imaging operation with respect to determining subsurface characteristics. In some embodiments, the subsurface radar apparatus 14 is configured for a pulse-echo, or other mode, and the seismic vibrations are used as a source of disturbance of the dielectric scatterers, which permits the subsurface radar apparatus 14 to detect the seismic wave motion via its output which interacts with the seismic scattering for high frame rate imaging performed by the imaging device 20. The subsurface radar apparatus can operate as a virtual vibrometer due at least in part to the high speed of acquisition offered by the subsurface radar 14, which can remove the sound speed limitation in the Earth, and not only for monitoring shear wave motion but also compressional wave motion.

The imaging device 20 measures characteristics of a response or return signals reflected from the subsurface, and performs high frame rate imaging from the response signals including, at least in part, a reflection of the SPR signal from a subsurface by dynamically generating a time sequence of high resolution images of properties of the mapped acoustic waves. In some embodiments, the imaging device 20 is part of the SPR apparatus 14, for example, including a receive antenna, which in turn communicates with the imaging device 20 that receives data from a network interface or other I/O device of the SPR apparatus 14 regarding the return signals. In some embodiments, the SPR transmit antenna and signal receiver may be the same, or may be different styles of elements, or be positioned in different locations. In other embodiments as shown in FIG. 1, the imaging device 20 is standalone or physically separate from but in electronic communication with the SPR apparatus 14 to perform an imaging operation. For example, the imaging device 20 may include but not be limited to sensors, transducers, scanning devices, or the like to generate high-resolution imaging results from the return signals. For example, to provide spatial scanning for the imaging device 20, the receiver may be moved, for example, rolled along the ground at a predetermined rate to provide spatial scanning for imaging. Furthermore, the acoustic sources can be separated from the radar apparatus 14 or physically combined. A signal receiver of the SPR apparatus 14 and/or the imaging device 20 may include a special purpose computer processor that measures a feature, for example, intensity, phase, frequency, and so on, of the response signals received from the SPR antenna, sensor, or other receiving device. In some embodiments, the received signal may be adapted, filtered, and/or sampled so as to preserve the signal for generating the images. The imaging device 20 can therefore perform a dynamic multi-wave imaging operation that provides for detecting small-scale spatially and/or temporally varying signatures. In some embodiments, the imaging device 20 can perform an iterative updating and interplay between source and receiver data to improve image definition by focusing the radar probing transmit signals with high clarity.

During operation of the system 10, the elastic waves produced by the acoustic wave generator 15 are imaged in real-time or near real-time applying a combination of imaging techniques. The application of signals output from the SPR apparatus 14 results in high spatial resolution and an extremely fast response time as compared to the speed of the propagating elastic waves, which enables the imaging of the elastic waves. For example, induced low frequency continuous elastic waves propagate away from the focus region, and are measured so that at various phases of the low frequency modulation, pulsed back-scattered signals are received and used to create the time sequence of images formed by the electromagnetic waves of the SPR 14. The positions of the scatterers can be used in the processing when comparing successive images in time to delineate the amplitude and phase of the elastic waves as they move away from the source. In some embodiments, for any radar wave imaging modality, the system and method monitors phase and amplitude changes away from the source by recording the positions of scattering objects and/or speckle positions. These parameters may be compared at nearby points in space used to determine the local acoustic wave velocity, viscoelastic losses, and/or related parameters with respect to the medium. Accordingly, scanning these measurements over predetermined areas of the medium allows an image of elastic properties or the like to be generated. Improved sensitivity may be obtained by imaging the viscoelastic properties of the subsurface soil because the parameters incorporate both elasticity and absorption. Analysis for motion can be performed by the imaging device 20 taking a sequence of images over time, looking in the spectral window centered about the acoustic wave source frequency, and resolving spatially averaged or filtered changes of Fourier intensity or phase changes for the collective motion of a spatial zone or cluster of scatterers changing in time. In some embodiments, the imaging device 20 includes a special purpose processor or otherwise communicates with a separate computer that analyzes dynamic multi-wave data of the images to quantify spatial variations in the viscoelastic properties of the subsurface.

Figure 2:
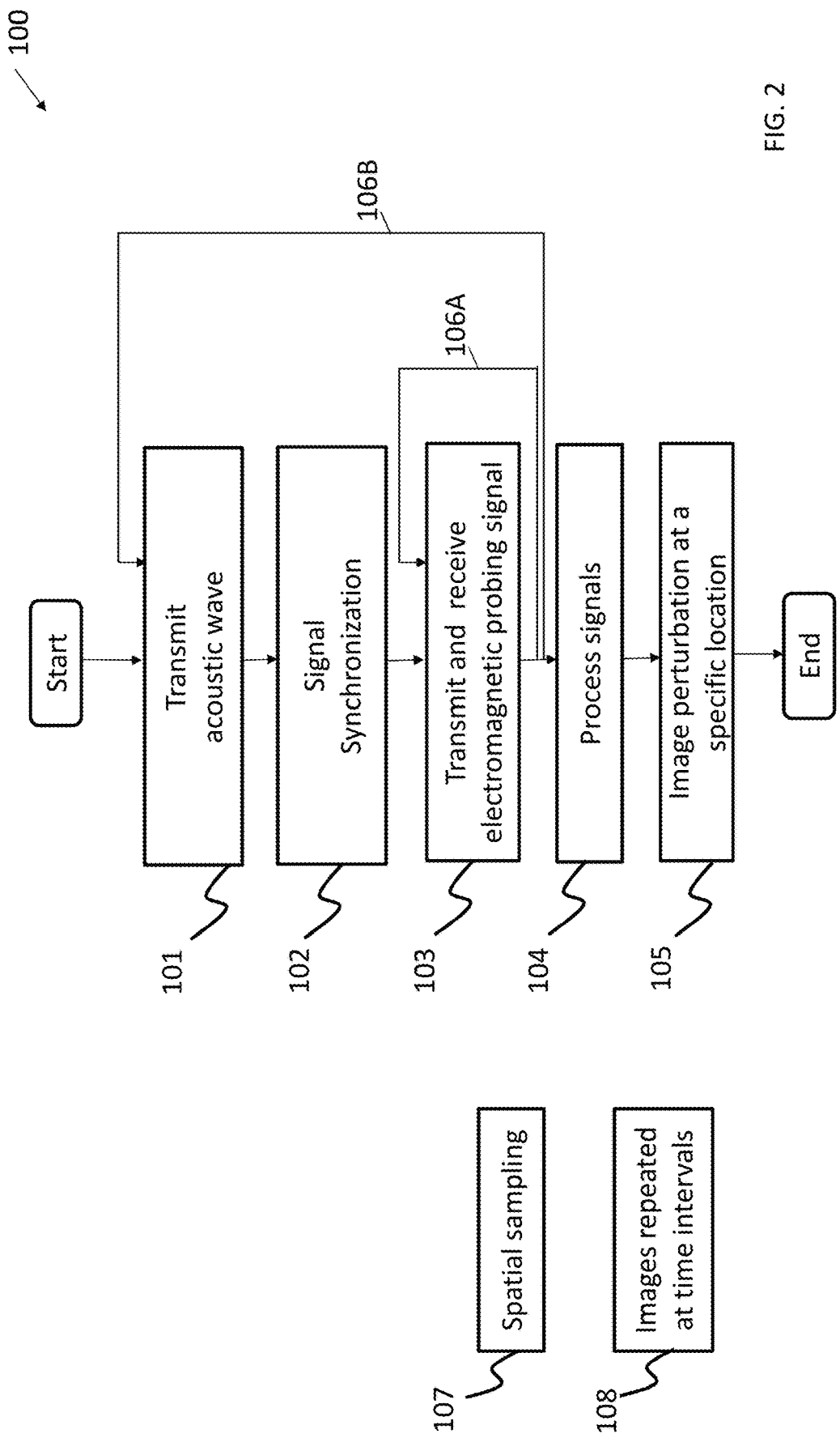
FIG. 2 is a flow diagram of a method for near-surface subsurface imaging, in accordance with embodiments of the present disclosure.

FIG. 2 is a flow diagram of a method 100 for near-surface subsurface imaging, in accordance with embodiments of the present disclosure. Some or all of the method 100 can be performed by elements of the heterogeneous subsurface imaging system 10 of FIG. 1.

At block 101, an acoustic wave is transmitted at a ground surface, for example, resulting in the generation of P waves and/or S waves at a subsurface.

At block 102, the subsurface radar is synchronized to the trigger source and a synchronized radar sampling is applied to the acoustic wave at a rate faster than the propagation speed of the waves. In some embodiments, the subsurface radar apparatus 14 includes a synchronization and sequential processing module 15 that performs this step. The synchronization and sequential processing module 15 may be provided for permitting a triggering operation to be performed, for example, as described herein. In some embodiments, a trigger device 16 is activated as part of the synchronization step.

At block 103, a high frequency probing signal is output from the subsurface radar apparatus 14 that interacts with the acoustic wave, for example, a shear wave, to allow a selective sensing of resonances to be produced to increase the signal-to-noise ratio. For example, the subsurface radar apparatus 14 may include focused transmit/receive sensors that can specifically target the response of particular subsurface features, and increase signal-to-noise while improving imaging resolution.

After computation of scanned lines derived from the interaction of the probing signal and acoustic wave, at block 104, the displacements versus time are extracted by producing and comparing sequential, spatial, and temporal variations in signals. Further processing is accomplished depending on the type of imaging selected. For example in one embodiment, temporally sequential displacements are compared or correlated to produce an elastography image.

Loops 106A, B (generally, 106) refer to a stacking operation that can be performed between foregoing steps of the flow diagram in FIG. 2, depending on various embodiments. In one embodiment, rapid acquisition of radar signals can be averaged so quickly that the acoustic wave appears stationary. In another embodiment, a processed acoustic signal is repeatedly sampled at the same spatial location through synchronous phasing and averaging. Stacking steps can be performed after step 101 or 103 depending on a stack at one spatial location or a stack at one acoustic vibration phase. As shown in loop 106A, a stacking operation relates to one acoustic vibration stage, and a sample average can be determined. As shown in loop 106B, a stacking operation is performed at a spatial location. In some embodiments, each stacking operation illustrated according to loop 106B may include multiple sample averages determined from loop 106A.

Figure 9:
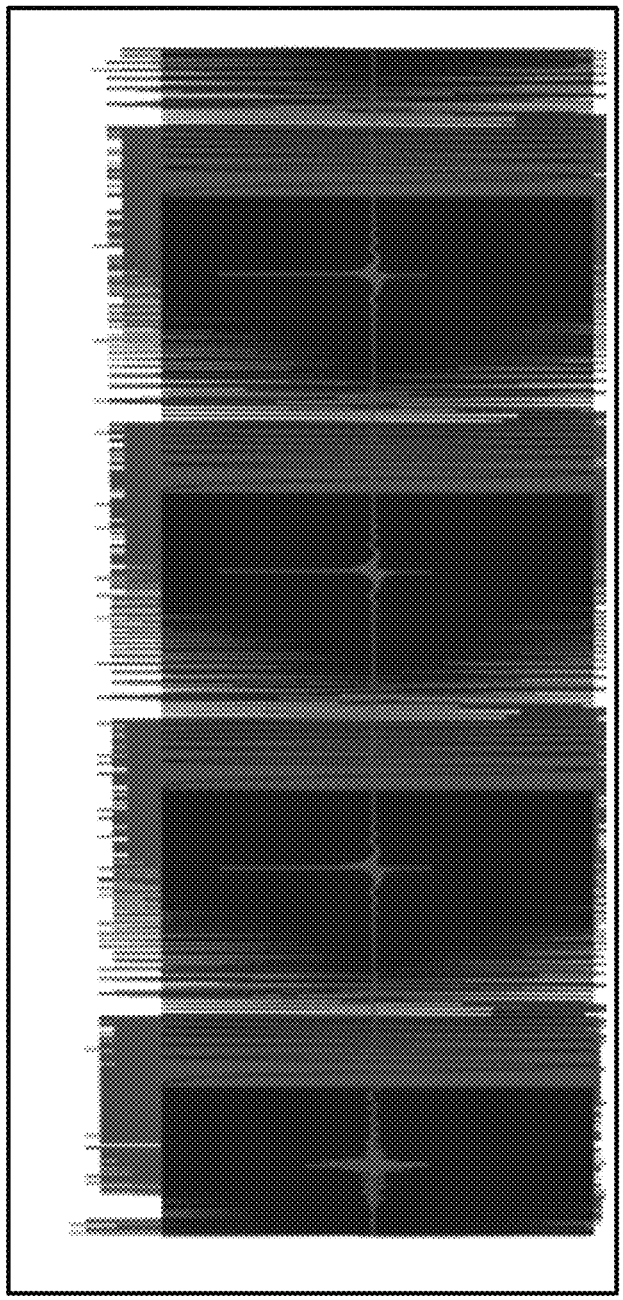

In some embodiments, illustrated by way of example in FIG. 9, the rapid sampling and matched filter signals for multiple interrogations of an acoustic pulse as needed for stacking are plotted. Here, a vibration signal frequency and amplitude can be monitored over time by a repeated rapid firing of a sequence of FMCW chirp signals. Shown are the transmitted (blue) and received (red) chirps and the corresponding successive matched-filter pulses (green) used in this analysis.

In block 107, a line or other unit of derived mechanical properties is converted to data and stored, for example, in a data storage device. In some embodiments, one pixel per spatial location is generated. At the end of the sequence depicted in FIG. 2, for example, after block 105, the receiving device 14 can move to a different location so that additional scanning operations can be performed. Alternatively, method 100 at blocks 101-104 is repeated as needed at later times to detect changes in mechanical properties of a subsurface region. Here, comparisons may be performed.

After the completion of all the parts of the image, for example, corresponding to image pixels or lines corresponding to spatial locations, at block 105, mechanical properties of the subsurface are computed and displayed by the imaging system 20; then the sequence of blocks 101-105 is repeated.

In block 108, after an imaging frame is finished, the process for filling in a new frame is initiated at a selected time interval such that the changes in subsurface properties can be monitored over time.

A feature of method 100 is that the system can perform an imaging operation, for example, similar to elastography, despite the low compressional wave to shear wave velocity ratio, e.g., the ratio of P wave to S wave velocities is less than 10. In shear wave elastography used in medical ultrasound applications in which there is a substantially greater difference between compressional and shear waves traveling through the human body, e.g., a ratio of P to S velocities between 50 and 150, which enables an S wave to be tracked with a P wave.

An operation using the system described herein may be performed with respect to seismic energy, even though the ratio of P wave to S wave velocities may be significantly low, i.e., on the order of 2-10, due to the state of the ground surface, i.e. comprising solid rocks, soils, sediments, and so on, which prevents the effectiveness of imaging when tracking shear wave motion with a pulsed P-wave. For example, the acoustic properties for dry sand may include a P wave velocity of 400-1200 m/s and an S wave velocity of 100-500 m/s. Accordingly, a hybrid imaging method in accordance with some embodiments includes the use of a high frequency SPR instrument 14, which provides a velocity of $10^8$ m/s at a frequency ranging from 10-400 MHz, providing penetration depths of 20-60 m and a wavelength of 1 m depending on the dielectric constant of the soil sediment. From this data, a set of time sequence of images can be produced. For example, at a 10 m depth, the system may instantaneously and repeatedly observe a 10 m long shear wave displacement field averaged over small volumes, or sub volumes, of the target subsurface as determined by the horizontal and vertical SPR resolution, e.g., a Fresnel zone size of 1 m for a 10 m depth. A time sequence of images may reveal the shear wave speeds, the viscoelastic properties, and local resonances. In some embodiments, the high velocity of radar waves permits an application of the system and method with respect to the imaging of propagating P waves in the Earth. In some embodiments, the ratio of radar velocity to acoustic wave velocity is many orders of magnitude.

As previously described, the detection of subsurface vibrations involves the ability to capture the shape and motion of the scattered signals of the acoustic waves for imaging with high sensitivity. To achieve this, the system 10 illustrated in FIG. 1 generates a plurality of radar traces from a processed dataset generated from the measured return signals. Each trace can identify the location of various reflectors or related back-scattered signals at various depths along the z axis. Successive trace data can be collected and recorded at different points in a spatial sequence along a ground surface.

Figure 5:
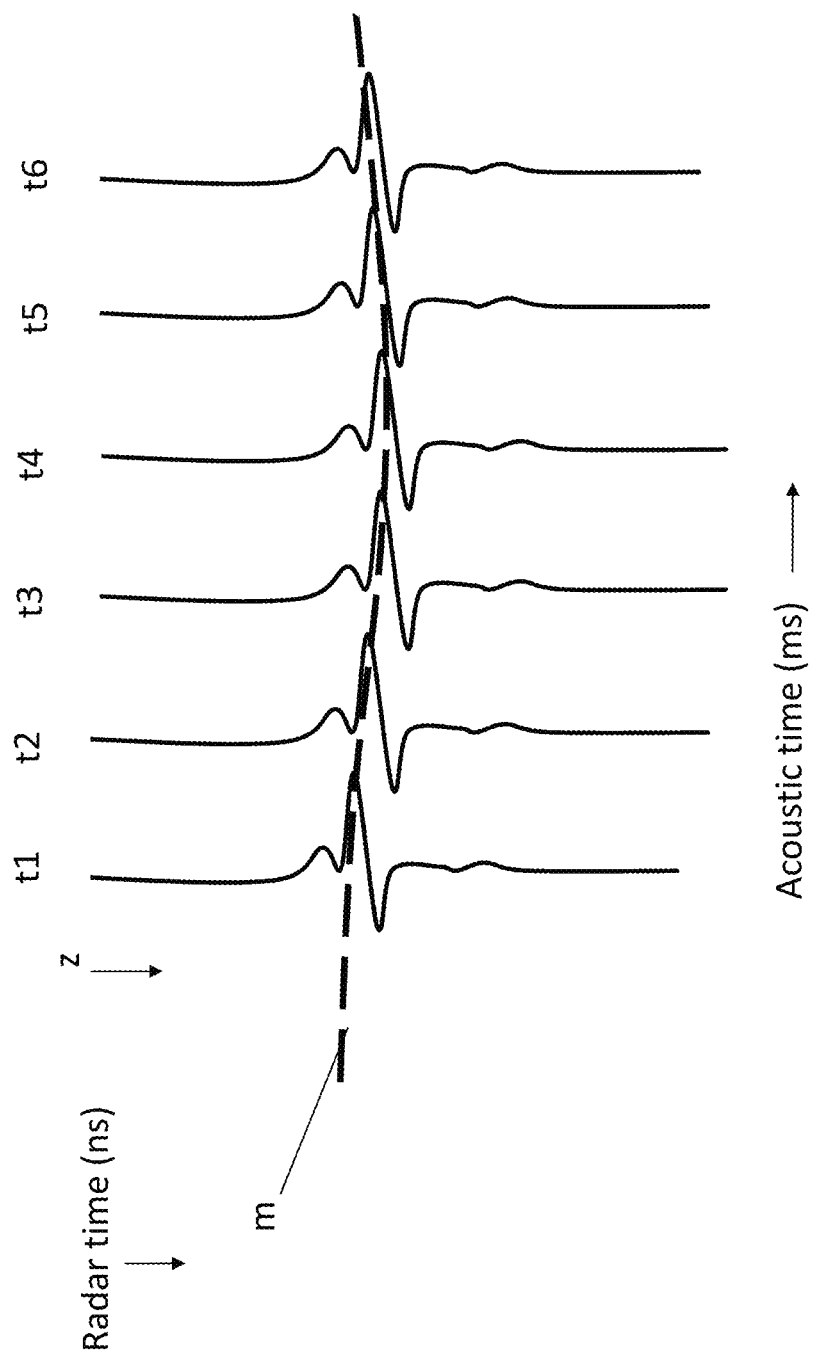
FIG. 5 is a graphical view illustrating the recording of characteristics of subsurface vibrations, in accordance with embodiments of the present disclosure.

FIG. 5 illustrates the tracking of the motion of a single scatterer over time. As shown in FIG. 5, the system 10 can produce one or more traces, e.g., illustrated as radar pulses, at a particular point, e.g., at a predetermined location, and generate a plurality of images corresponding to the identified point over time, e.g., traces t1-t6 (measured in milliseconds), at a predetermined frame rate. Each trace t1-t6 can correspond to an average of a predetermined number of radar pulses reflected from the single scatterer over successive times. In particular, the traces t1-t6 are received radar signals received at different times from the same subsurface location of the system, which senses the acoustic wave (m) propagating past the subsurface location. For example, as shown, each dash in the wave (m) shown in FIG. 5 corresponds to the same scatterer observed at different times. The shape and motion of a seismic p or s-wave (m) can therefore be captured. This time sequence of images may reveal shear wave speeds, viscoelastic properties, local resonances, and so on, when the trigger device 16 is activated.

Figure 6:
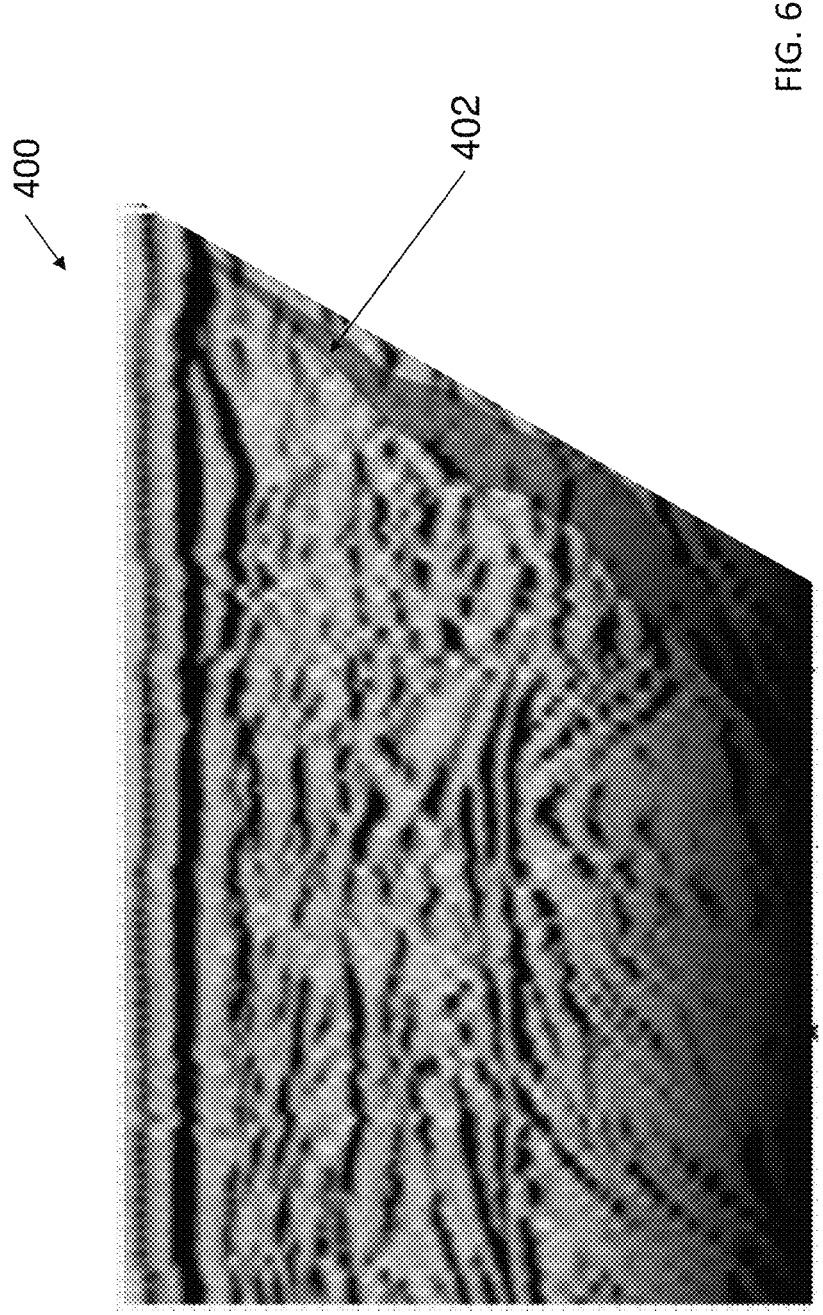
FIG. 6 is a graphical view illustrating displayed variations in mechanical and viscoelastic properties determined from an imaging technique performed at a subsurface heterogeneity, in accordance with embodiments of the present disclosure.

As shown in FIG. 6, areas of interest in an image 400 produced by the system may be identified. Referring in particular to FIG. 6, a static GPR image is overlaid by a shaded region 402 indicating a reduced elastic modulus inferred by time shifts of a plurality of radar pulses as they interact with acoustic waves. In other examples, interpreted spatial variations in viscoelastic properties of the Earth surface or other shapes induced by the acoustic wave may be highlighted, for example, according to a color-code scheme. Here, subtle differences in amplitude in the shaded region of the image may assist in the detection and characterization of subsurface heterogeneities with increased signal-to-noise and improved imaging resolution. In other examples, data regarding differences in time of flight (TOF) measurements of the radar signal with and without an acoustic source insonifying a selected subsurface region can be used to derive velocity and elastic modulus images.

Figure 7:
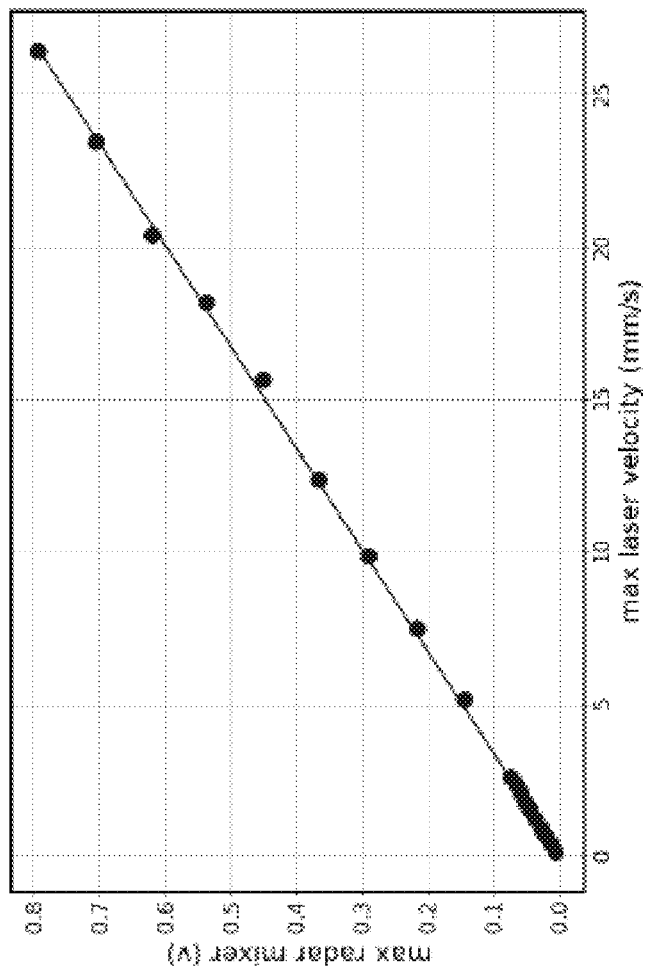
FIGS. 7-9 are graphical views illustrating various features of a heterogeneous subsurface imaging system and method, in accordance with embodiments of the present disclosure.

As previously described, a feature of the systems and methods of the inventive concept is the increased resolution and sensitivity over that of individual conventional seismic and subsurface imaging techniques. Accordingly, resolution can be approximately on the order of a wavelength in focused imaging applications. For example, an acoustic source operating at 100 Hz may produce a wavelength that is approximately 3.3 m in air and 33 m in the earth. At 2.4 GHz, a radar apparatus may produce a wavelength of 12.5 cm in air and 6 cm in earth. In this inventive method, displacement changes on the order of a micron can been detected at these example frequencies. Referring by way of example to FIG. 7, an improvement in resolution of at least four orders of magnitude may be achieved, in particular, as shown by the linear behavior over a range of vibration amplitudes.

Figure 8:
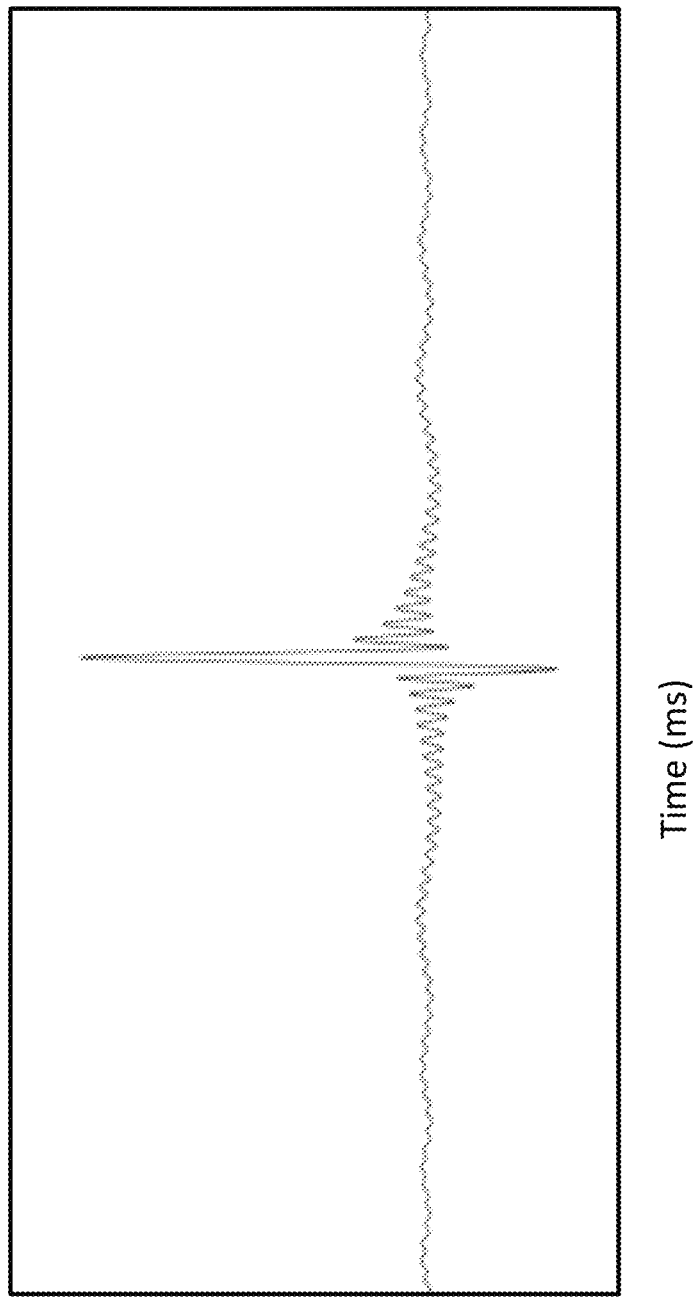

Another example relates to the processing by the subsurface radar apparatus 14 of FMCW chirp signals, in which the range to a target, the vibration amplitude (acoustic field displacement), and vibration frequency can be measured. Referring to FIG. 8, as an example of signal processing, a matched filter for a single acoustic pulse is shown. More specifically, a matched-filter pulse is derived by convolving transmitted and received FMCW chirp signals.

While the invention has been shown and described with reference to specific embodiments, it should be understood by those skilled in the art that various changes in form and detail may be made therein without departing from the scope of the invention.

What is claimed is:

1. A method for determining a subsurface feature, comprising:
    transmitting a surface penetrating radar (SPR) signal at a ground surface;
    receiving a response signal that includes elastic waves of a lower frequency acoustic source that interact with the SPR signal;
    rapidly processing the response signal including the SPR signal modified by the interaction with the elastic waves; and
    determining a physical characteristic of the subsurface feature from the response signal, wherein the elastic waves are produced by at least one vibrating source that insonifies subsurface features, and wherein the method further comprises performing a rapid imaging of a dynamic scattered wave field generated by the insonification, wherein the elastic waves include an induced low frequency continuous elastic wave propagating away from a focus region measured using the SPR signal so that at various phases of a low frequency modulation, pulsed waves are sent into the ground surface and back-scattered signals are received and used to create a time sequence of images formed by the SPR signal.

2. The method of claim 1, further comprising performing a dynamic multi-wave imaging operation that provides for detecting small-scale spatially varying signatures through active perturbing and probing of mechanical properties in order to characterize subsurface structures.

3. The method of claim 1, further comprising performing a stacking operation, wherein a signal-to-noise ratio is increased by stacking repeated acoustic pulses and/or probing radar signals.

4. A system for determining subsurface characteristics, comprising:
    a radar-generating source that transmits a surface penetrating radar (SPR) signal to remotely sense a subsurface vibration; and
    an imaging apparatus that produces time sequences from a received SPR signal perturbed by acoustic signals corresponding to the subsurface vibration.

5. A method for determining a subsurface feature, comprising:
    transmitting a surface penetrating radar (SPR) signal at a ground surface;
    receiving a response signal that includes elastic waves of a lower frequency acoustic source that interact with the SPR signal;
    rapidly processing the response signal including the SPR signal modified by the interaction with the elastic waves; and
    determining a physical characteristic of the subsurface feature from the response signal, wherein the elastic wave includes an induced low frequency continuous elastic wave propagating away from a focus region measured using the SPR signal so that at various phases of a low frequency modulation, pulsed waves are sent into the ground surface and back-scattered signals are received and used to create a time sequence of images formed by the SPR signal.

6. A method for determining a subsurface feature, comprising:
    transmitting a surface penetrating radar (SPR) signal at a ground surface;
    receiving a response signal that includes elastic waves of a lower frequency acoustic source that interact with the SPR signal;
    rapidly processing the response signal including the SPR signal modified by the interaction with the elastic waves; and
    determining a physical characteristic of the subsurface feature from the response signal; and
    performing a dynamic multi-wave imaging operation that provides for detecting small-scale spatially varying signatures through active perturbing and probing of mechanical properties in order to characterize subsurface structures.

7. A method for determining a subsurface feature, comprising:
- transmitting a surface penetrating radar (SPR) signal at a ground surface;
- receiving a response signal that includes elastic waves of a lower frequency acoustic source that interact with the SPR signal;
- rapidly processing the response signal including the SPR signal modified by the interaction with the elastic waves; and
- determining a physical characteristic of the subsurface feature from the response signal;
- performing a stacking operation, wherein a signal-to-noise ratio is increased by stacking repeated acoustic pulses and/or probing radar signals; and
- performing a dynamic multi-wave imaging operation that provides for detecting small-scale spatially varying signatures through active perturbing and probing of mechanical properties in order to characterize subsurface structures.

* * * * *